United States Patent [19]
Yamanaka

[11] Patent Number: 5,904,072
[45] Date of Patent: May 18, 1999

[54] BICYCLE CRANK ARM

[75] Inventor: Masahiro Yamanaka, Izumisano, Japan

[73] Assignee: Shimano Inc., Osaka, Japan

[21] Appl. No.: 08/770,501

[22] Filed: Dec. 20, 1996

[51] Int. Cl.⁶ .................................................. G05G 1/14
[52] U.S. Cl. ........................ 74/594.2; 74/594.1; 474/160
[58] Field of Search ............................... 74/594.1–594.6; 474/160, 144

[56] References Cited

U.S. PATENT DOCUMENTS

| | | | |
|---|---|---|---|
| 4,439,172 | 3/1984 | Segawa | 474/160 |
| 4,811,626 | 4/1989 | Bezin | 74/594.1 |
| 5,010,785 | 4/1991 | Romero | 74/594.1 |
| 5,179,873 | 1/1993 | Girvin | 74/594.1 |
| 5,197,353 | 3/1993 | Trenerry et al. | 74/594.1 |
| 5,209,581 | 5/1993 | Nagano | 384/545 |
| 5,257,562 | 11/1993 | Nagano | 74/594.2 |
| 5,435,869 | 7/1995 | Christensen | 156/175 |
| 5,609,070 | 3/1997 | Lin et al. | 74/594.1 |
| 5,623,856 | 4/1997 | Durham | 74/594.1 |
| 5,644,953 | 7/1997 | Leng | 74/594.2 |

FOREIGN PATENT DOCUMENTS

| | | | |
|---|---|---|---|
| 0176639 | 4/1986 | European Pat. Off. | 74/594.1 |
| 417313 | 11/1910 | France | 74/594.1 |
| 843684 | 7/1939 | France | 74/594.1 |
| 980071 | 5/1951 | France | 74/594.1 |
| 2441533 | 6/1980 | France | 74/594.1 |
| 2225296 | 5/1990 | United Kingdom | 74/594.1 |

OTHER PUBLICATIONS

'96 Shimano Bicycle System Components—Dealer Sales & Support Manual; Aug. 1995; pp. 1, 48 and 92.

*Primary Examiner*—Vinh T. Luong
*Attorney, Agent, or Firm*—Shinjyu Global IP Counselors, LLP

[57] ABSTRACT

A bicycle crank arm assembly for a bicycle which is designed for mounting a sprocket thereto. The crank arm has a centrally located hub portion, a crank portion extending radially outwardly from the hub portion and at least three fastening fingers extending radially outwardly from the hub portion. The fastening fingers are designed to have substantially the same stiffness at their free ends. This can be accomplished in a variety of ways such as change the cross-section of the fastening fingers adjacent the crank portion or changing the shape of the sprocket mounting portions of the fastening fingers. Also, in certain embodiments, the fastening fingers adjacent the crank portion are constructed such that their rear surfaces lie in the same plane as the rear surface of the crank portion adjacent thereto, or in a lower plane.

18 Claims, 12 Drawing Sheets

BICYCLE CRANK ARM

FIELD OF THE INVENTION

The present invention generally relates to a bicycle crank arm which fixedly couples a bicycle pedal to the bicycle crank spindle and supports one or more sprockets thereon. More specifically, the present invention is directed to a bicycle crank arm having a hub portion with fastening fingers extending radially outwardly therefrom.

BACKGROUND OF THE INVENTION

Bicycling is becoming an increasingly more popular form of recreation as well as a means of transportation. Moreover, bicycling has also become a very popular competitive sport. Whether the bicycle is used for recreation, transportation or competition, the current trend is to construct bicycles which are stronger as well as lighter than prior bicycles.

Accordingly, every part of a bicycle is constantly being redesigned to minimize weight and maximize strength. One part of the bicycle which has been redesigned to be lighter and stronger is the bicycle crank arm. Each bicycle has a pair of bicycle crank arms which are coupled to the bicycle crank spindle. The crank arms extend outwardly from the crank spindle in opposite directions and have pedals attached to their free ends for supporting the rider's feet. Rotation of the pedals by the rider causes one or more front sprockets to rotate which in turn moves the bicycle chain to rotate one or more rear sprockets, and thus, rotate the rear wheel of the bicycle. In certain crank arm designs, the front sprocket or sprockets are coupled directly to the crank arm by fastening fingers. The fastening fingers are coupled to the hub portion of the crank arm, and extend radially outwardly from the hub portion of the crank arm.

An example of such a crank arm is sold by Shimano, Inc. under its Dura-Ace line of professional components. One drawback of this crank arm is that the fastening fingers which are adjacent the crank portion are stiffer than the remaining fastening fingers. Especially for the competitive or serious rider, the connection between the fastening fingers of the crank arm and the front sprocket or sprockets should be uniform. Another drawback to the crank arm sold by Shimano, Inc. under its Dura-Ace line of professional components is that it is difficult to properly finish the crank arm since the fastening fingers which are adjacent the crank portion have ribs that interfere with the welding and polishing of a weld located therebetween.

In view of the above, there exists a need for a bicycle crank arm having fastening fingers with substantially the same stiffnesses for supporting and coupling a sprocket thereto. Also there exists a need for a bicycle crank arm having fastening fingers which do not interfere with the manufacturing and finishing of the crank arm. This invention addresses these needs in the art as well as other needs in the art which will become apparent to those skilled in the art from this disclosure.

SUMMARY OF THE INVENTION

One object of the present invention is to provide a bicycle crank arm having fastening fingers with substantially the same stiffnesses at their free ends for supporting and coupling one or more sprockets thereto.

Another object of the present invention is to provide a sprocket supporting crank arm which is relatively easy and inexpensive to manufacture.

Still another object of the present invention is to provide a bicycle crank arm which is light weight and strong.

The foregoing objects can basically be attained by providing a bicycle crank arm having a hub portion adapted to be coupled to a crank spindle of a bicycle, a crank portion having an inner end coupled to the hub portion and an outer end adapted to be coupled to a bicycle pedal; and at least three fastening fingers extending radially outwardly from the hub portion to a free end for mounting a bicycle sprocket thereto. The inner end of the crank portion interconnects a pair of the fastening fingers. The fastening fingers have substantially the same stiffnesses at the free ends of the fastening fingers.

In a preferred form of the present invention, the crank portion, hub portion and fastening fingers are all formed as a one-piece, unitary member. Preferably, the crank portion has a recess with a lid member attached thereto.

In the preferred embodiment of the present invention, the hub portion has five fastening fingers with mounting holes formed at their free ends for coupling a sprocket thereto via conventional fasteners.

In other embodiments of the present invention, the fastening fingers can support two or more sprockets.

Other objects, advantages and salient features of the present invention will become apparent to those skilled in the art from the following detailed description, which, taken in conjunction with the annexed drawings discloses preferred embodiments of the present invention.

BRIEF DESCRIPTION OF THE DRAWINGS

Referring now to the attached drawings which form part of this original disclosure.

DETAILED DESCRIPTION OF THE PREFERRED EMBODIMENTS

Figure 1:
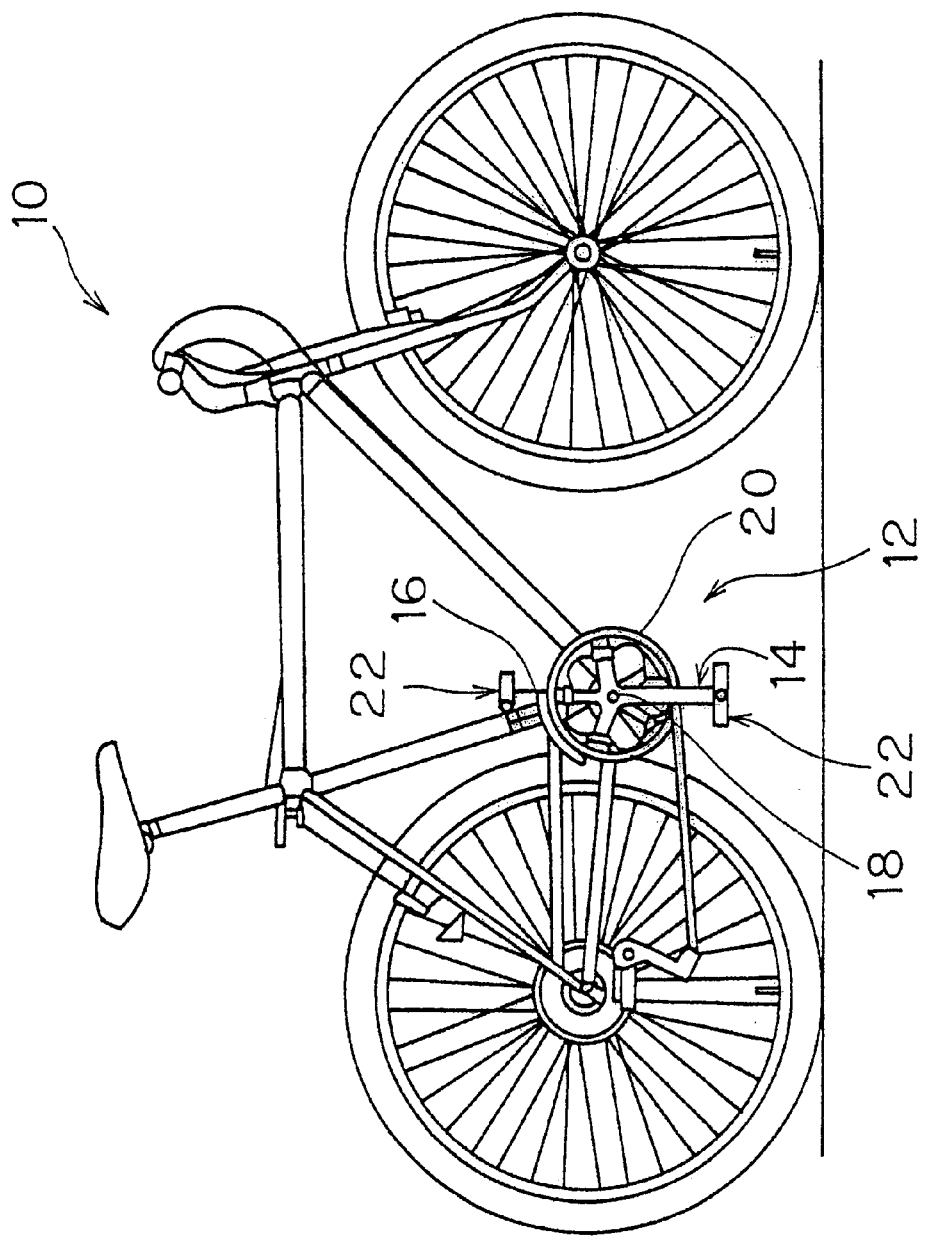
FIG. 1 is a side elevational view of a conventional bicycle using a crank arm in accordance with the present invention.
Figure 2:
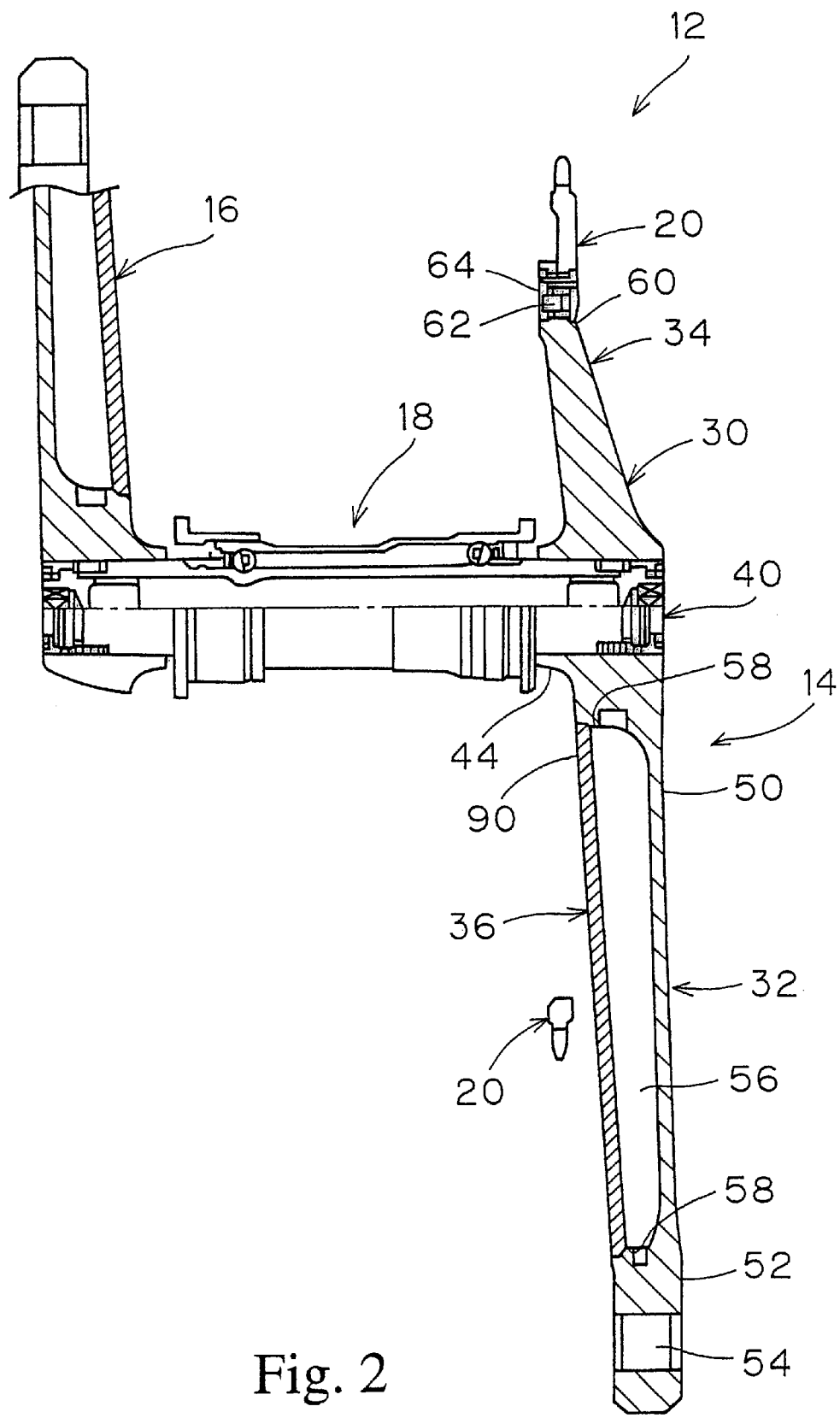
FIG. 2 is a partial end elevational view of the crank arm illustrated in FIG. 1 coupled to a crank spindle and with certain parts shown in cross-section for the purposes of illustration.

Referring initially to FIGS. 1 and 2, a conventional bicycle 10 is illustrated having a crank assembly 12 in accordance with the present invention. Bicycles and their various components are well-known in the prior art, and thus, bicycle 10 and its various components will not be discussed or illustrated in detail herein, except for the components which relate to the present invention. In other words, only crank assembly 12 will be discussed and illustrated in detail herein.

Basically, crank assembly 12 includes a right crank arm 14, a left crank arm 16, a crank spindle 18, one or more sprockets 20 and a pair of pedals 22. Left crank arm 16, crank spindle 18, one or more sprockets 20 and a pair of pedals 22 are preferably conventional components which are well known in the art. Thus, these components will not be discussed in detail herein. By way of example, these components can be similar to the corresponding components of SHIMANO'S Dura-Ace line.

Figure 3:
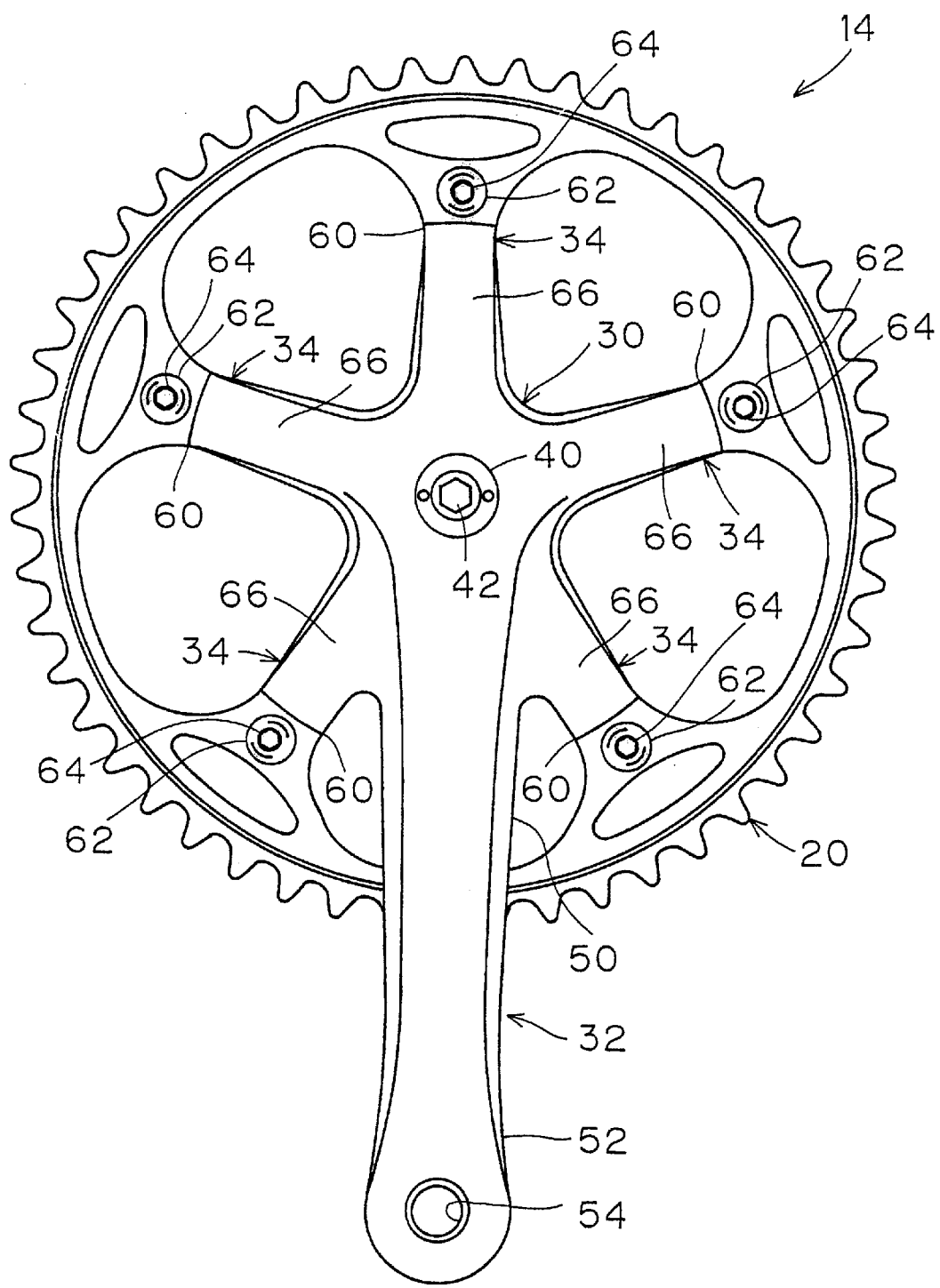
FIG. 3 is a front side elevational view of a crank arm in accordance with the present invention with a sprocket fixedly coupled to the crank arm to form a crank set.
Figure 4:
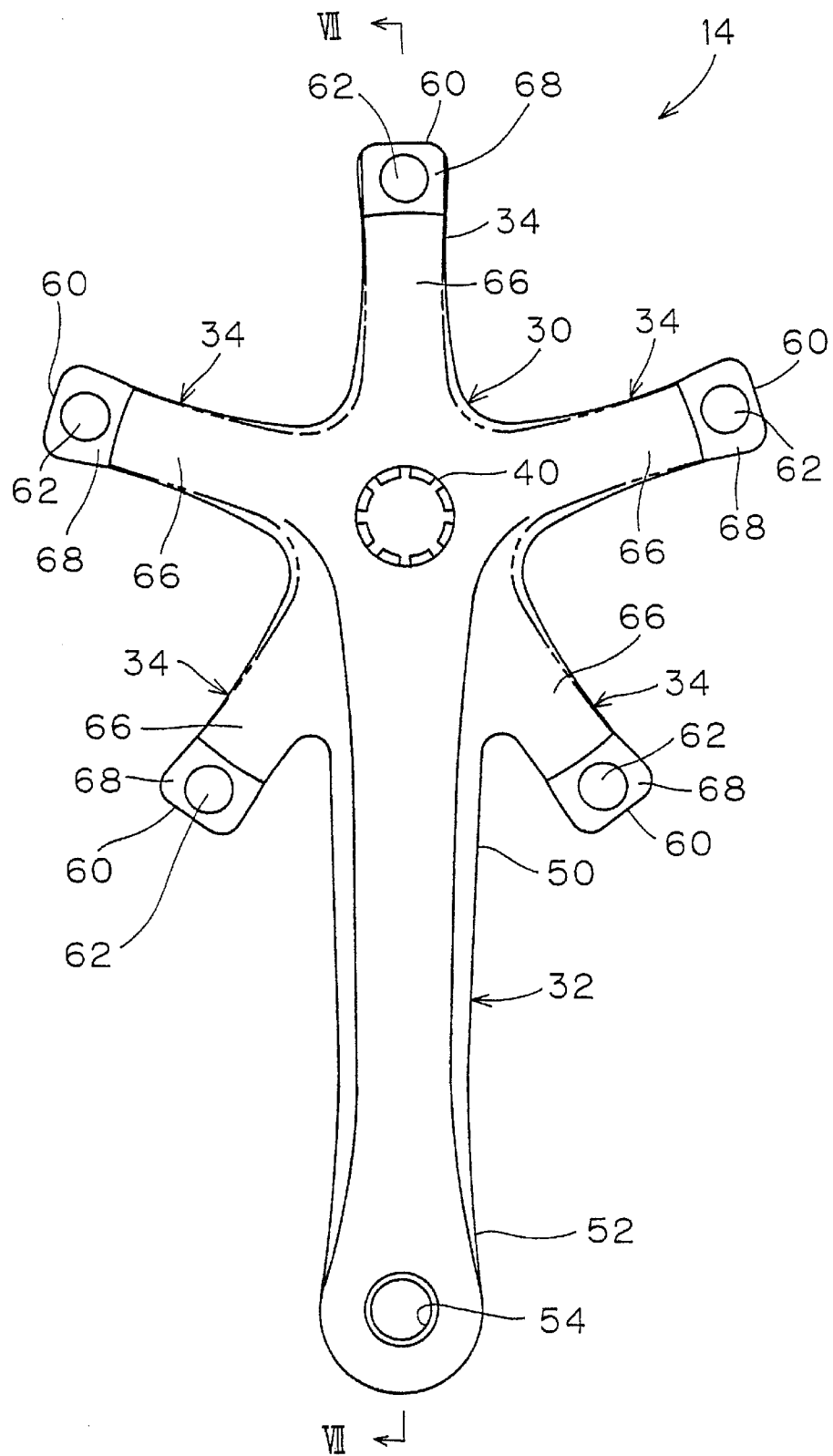
FIG. 4 is a front side elevational view of the crank arm illustrated in FIG. 2 with certain parts removed for purposes of illustration.
Figure 5:
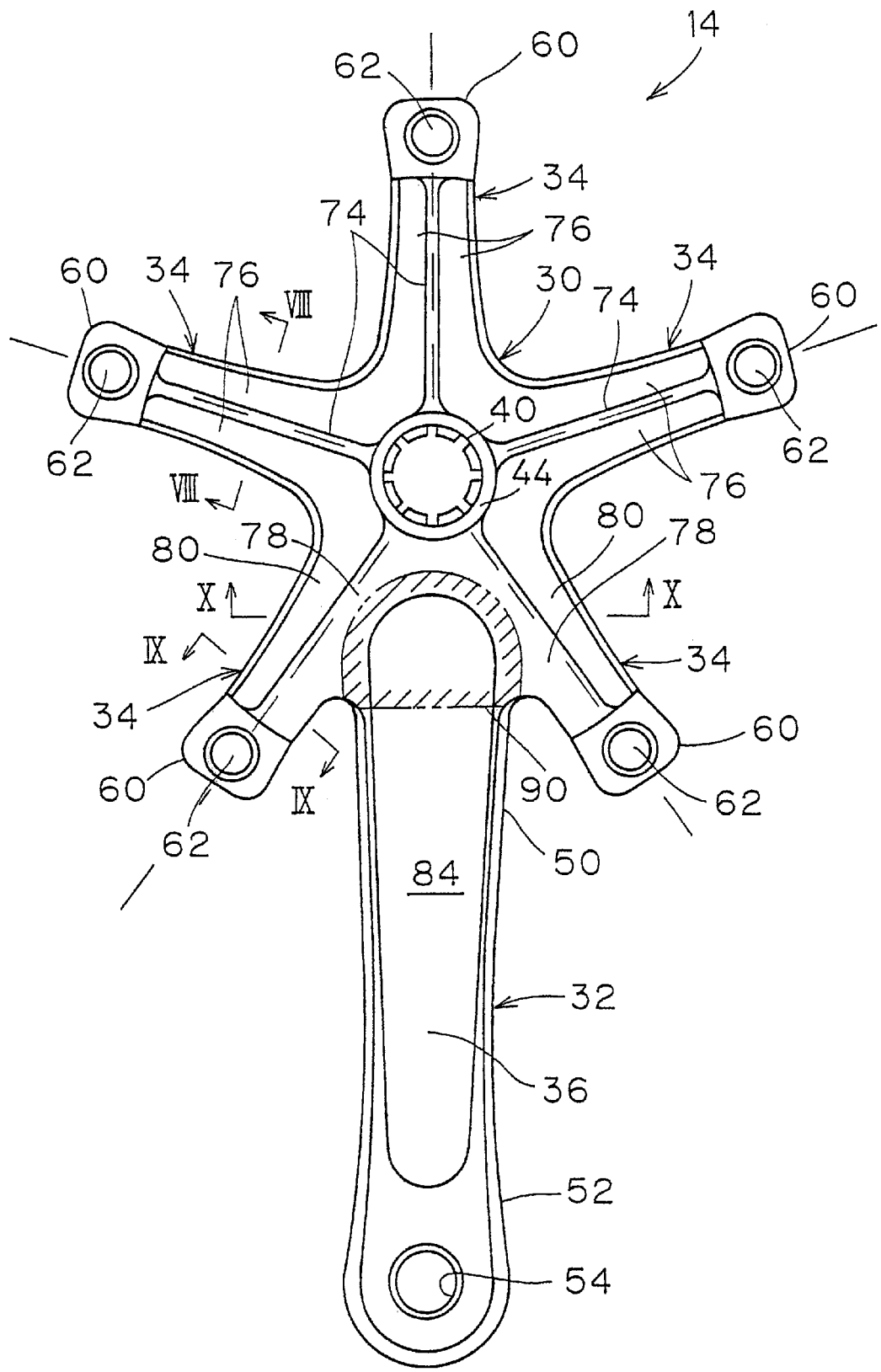
FIG. 5 is a rear side elevational view of the crank arm illustrated in FIGS. 2 and 3 with certain parts removed for purposes of illustration.

Referring now to FIGS. 3–5, right crank arm 14 includes a hub portion 30, a crank portion 32, five fastening fingers 34 and a lid member 36. Preferably, hub portion 30, crank portion 32 and fastening fingers 34 are all integrally formed as a one-piece, unitary member utilizing conventional manufacturing techniques such as stamping or casting. Preferably, crank arm 14 is constructed of a light weight metallic material such as titanium, an aluminum alloy or stainless steel.

Lid member 36, on the other hand, is preferably fixedly coupled to crank portion 32 such that it becomes an integral part of crank portion 32. Preferably, lid member 36 is secured to crank portion 32 by arc welding utilizing argon gas. Of course, lid member 36 can be joined to crank portion 32 by an adhesive instead of by welding. Examples of adhesives which can be utilized include epoxy resins and cyanoacrylates. Caulking and other types of adhesives may also be used.

Hub portion 30 has a center bore 40 for non-rotatably receiving crank spindle 18 therein. Preferably, bore 40 has a non-circular cross-section which mates with the end of crank spindle 18. For example, bore 40 can be splined to mate with splines of crank spindle 18. Of course, it will be apparent to those skilled in the art from this disclosure that other known shapes can be utilized. Hub portion 30 is fixedly coupled to crank spindle 18 via a conventional crank bolt 42 in a substantially conventional manner. Accordingly, rotation of hub portion 30 causes crank spindle 18 to rotate therewith. The front surface of hub portion 30 is preferably smooth and blends into crank portion 32 and fastening fingers 34. The rear surface of hub portion 30 has an annular flange 44 surrounding bore 40.

Crank portion 32 has an inner end 50 integrally formed with hub portion 30 and a free outer end 52 with a mounting hole 54 formed therein for attaching one of the pedals 22 thereto. Preferably, mounting hole 54 is threaded to fixedly couple the spindle of one of the pedals 22 thereto in a conventional manner. Crank portion 32 preferably also has a longitudinally extending recess 56 which extends between inner end 50 and outer end 52 adjacent mounting hole 54. This recess 56 is covered by lid member 36 to form a hollow crank portion 32. By providing recess 56 in crank portion 32, the weight of crank arm 14 can be minimized. Of course, recess 56 and lid member 36 can be eliminated, if needed or desired.

Recess 56 is substantially keel-shaped, with the bottom portion of recess 56 being virtually parallel to the front surface of crank portion 32 along its middle section. The upper periphery of recess 56 is provided with an annular step or ledge 58 for receiving and supporting lid member 36 therein. In particular, lid member 36 fits into recess 56 and sits on annular ledge 58, and is then welded thereto. Of course, any build-up from welding can be ground off to produce a finished surface with an attractive appearance. Once lid member 36 is welded to crank portion 32, recess 56 becomes completely enclosed to form a hollow crank arm. Preferably, lid member 36 forms a substantially flat, rear surface of crank portion 32.

Fastening fingers 34 extend radially outwardly from hub portion 30 and has a free end 60. Free end 60 of each fastening finger 34 has a mounting hole 62 for securing at least one sprocket 20 thereto via a plurality of fasteners 64. Preferably, fasteners 64 are conventional fasteners. For example, fasteners 64 can be chain wheel mounting bolts with ring nuts which are commonly used to couple the sprocket to the fastening fingers of a crank arm. Fasteners 64 are preferably constructed of a light weight material such as an aluminum alloy or titanium. Of course, other types of fasteners and/or materials can be utilized.

As seen in FIGS. 4 and 5, fastening fingers 34 are preferably equally spaced apart about hub portion 30, i.e., fastening fingers 34 are spaced 72° apart. Of course, while five fastening fingers 34 are illustrated, it will be apparent to those skilled in the art from this disclosure that fewer or more fastening fingers 34 could be utilized. For example, crank arm 14 could be constructed with three or four fastening fingers which are equally spaced apart about the center of hub portion 30. In these variations, of course, it is desirable to have the fastening fingers with substantially the same stiffnesses at their free ends as discussed below.

As seen in FIG. 4, the front surfaces of fastening fingers 34 have a contoured section 66 and a substantially flat section 68. Each contoured section 66 is curved along the length of its fastening fingers 34 between its flat section 68 and hub portion 30. At hub portion 30, contoured sections 66 blends smoothly into hub portion 30 and into crank portion 32.

Figure 6:
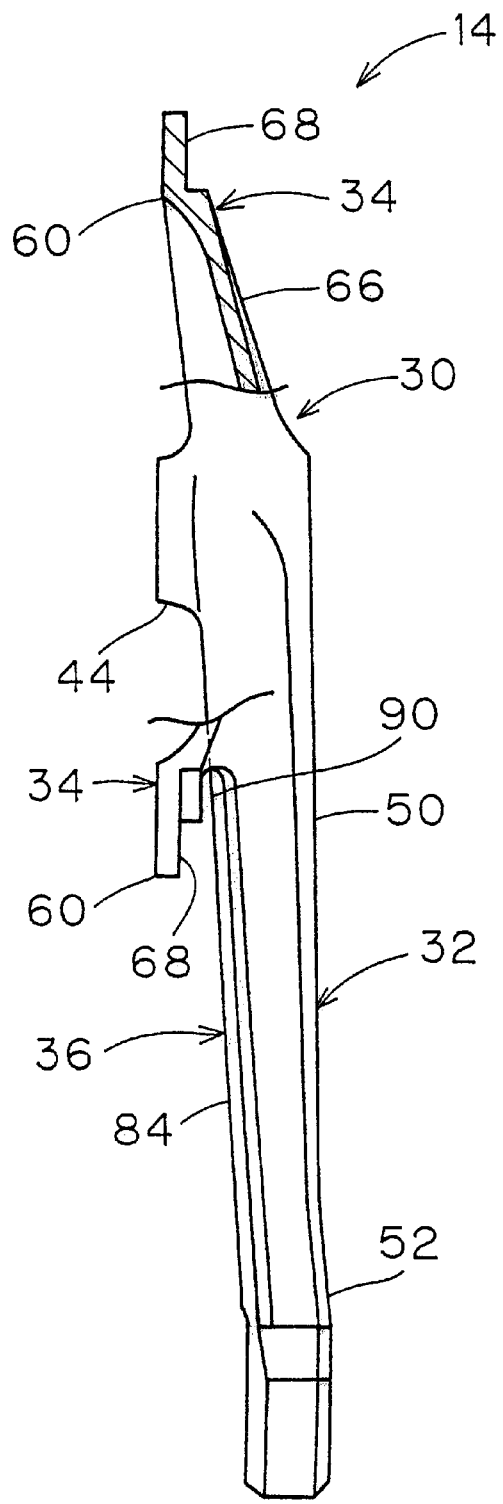
FIG. 6 is an end elevational view of the crank arm illustrated in FIGS. 2–4 with certain parts removed for purposes of illustration.
Figure 7:
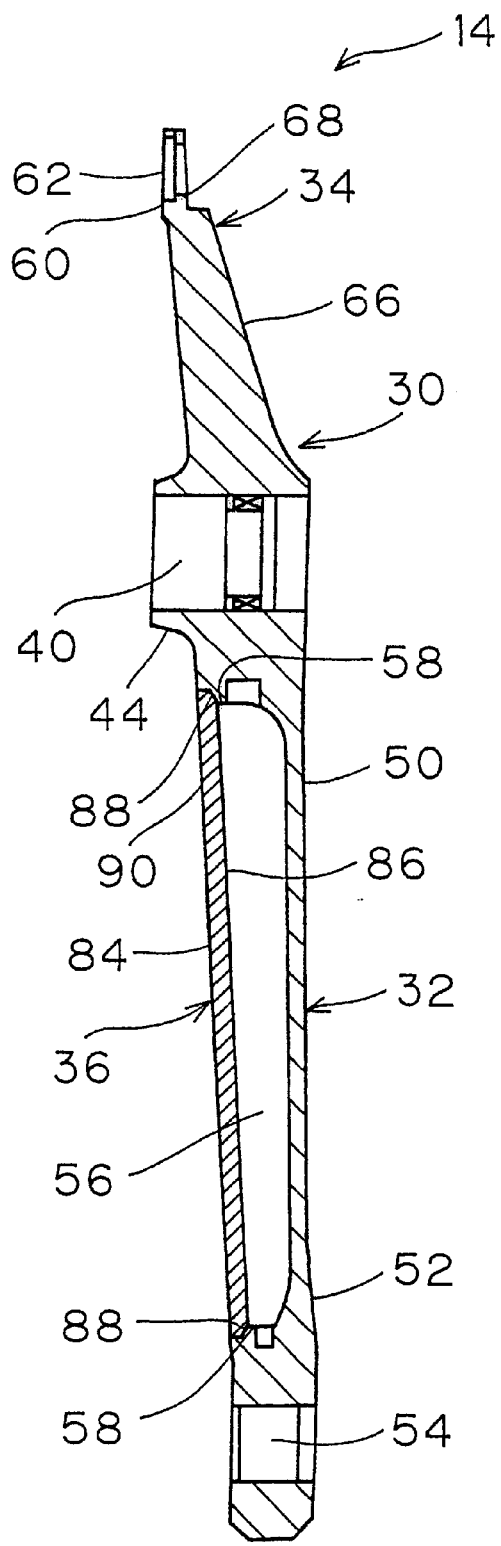
FIG. 7 is a longitudinal cross-sectional view of the crank arm illustrated in FIGS. 2–5 taken along section line 7—7 of FIG. 5.

As seen in FIGS. 2, 6 and 7, flat sections 68 of the front surface are located at the free ends 60 of each of the fastening fingers 34. Flat sections 68 engage the rear surface of sprocket 20 for supporting sprocket 20 thereon. Preferably, the flat sections 68 are recessed from the respective contoured section 66 of the front surface of the respective fastening finger 34 such that a smooth transition occurs between the contoured sections 66 of fastening fingers 34 and the rear surface of sprocket 20.

Figure 8:
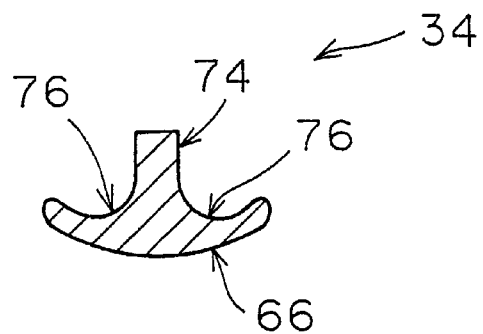
FIG. 8 is a transverse cross-sectional view of one of the fastening fingers of the crank arm illustrated in FIGS. 3–5 taken along section line 8—8 of FIG. 5.

As seen in FIGS. 5 and 8, the three fastening fingers 34 which are not adjacent to crank portion 32 each has a centrally located rib 74 and a pair of curved recesses or grooves 76. Ribs 74 extend radially outwardly from annular flange 44 to free ends 60, with one of the curved recesses 76 being located on each side of each of the ribs 74 to form a transverse cross-section as seen in FIG. 8. Rib 74 adds additional strength to each of these fastening fingers 34 to provide them with the desired stiffnesses. The two fastening fingers 34 which are adjacent to crank portion 32 have widths, measured between their front and rear sides, that are smaller than the widths of the remaining three fastening fingers 34 as measured between their front and rear sides. In other words, each rib 74 extends outwardly from its base portion of its associated fastening finger to form an inverted T-shape as seen in FIG. 8. The two fastening fingers 34 adjacent crank portion 32 are flatter than the remaining fastening fingers 34. Also the rear surfaces of the fastening fingers 34 which are adjacent crank portion 32 are lower than the rear surface of crank portion 32. This allows lid member 36 to be easily fastened and finished without interference from the adjacent fastening fingers 34 as mentioned below.

Figure 9:
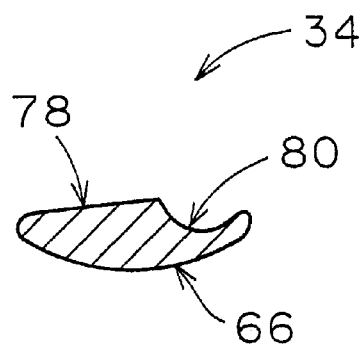
FIG. 9 is a transverse cross-sectional view of one of the fastening fingers positioned adjacent the crank portion of the crank arm illustrated in FIGS. 3–5, taken along section line 9—9 of FIG. 5.
Figure 10:
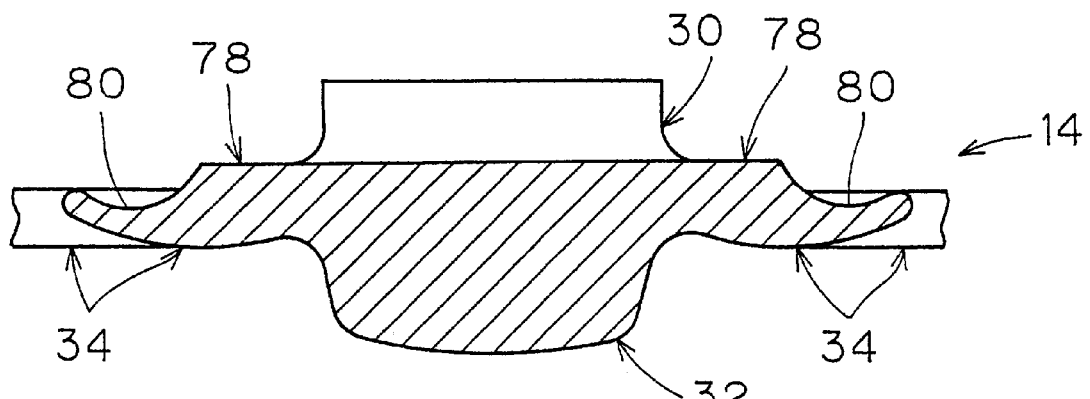
FIG. 10 is a transverse cross-sectional view of the crank arm illustrated in FIGS. 3–5, taken along section line 10—10 of FIG. 5.

The remaining two fastening fingers 34 do not have such ribs which correspond to ribs 74. In particular, if the fastening fingers 34 adjacent to the crank portion 32 were provided with ribs, than they would be stiffer than the other three fastening fingers 34. This is due to the fact that the crank portion 32 provides additional rigidity and stiffness to the two adjacent fastening fingers 34. Therefore, the two fastening fingers 34 adjacent to crank portion 32 have a different transverse cross-section than the other fastening fingers 34 as seen in FIGS. 9 and 10. In particular, the two fastening fingers 34 adjacent crank portion 32 have web sections 78 interconnecting crank portion 32 with the two adjacent fastening fingers 34. Each of the two fastening fingers 34 adjacent crank portion 32 also has a curved recess or groove 80 extending radially outwardly from annular flange 44 to its free end 60.

Each fastening finger 34 of crank arm 14 has a stiffness in a direction normal to its flat section 68 at its free end 60. The fastening fingers 34 are ideally designed such that each fastening finger 34 has substantially the same stiffness. However, it is acceptable if the difference between the stiffnesses' of each pair of the fastening fingers 34 is less than fifty percent of the individual stiffness' of each of the fastening fingers 34. The difference between the stiffnesses' of each pair of the fastening fingers 34 is also acceptable if it is less than thirty percent of the individual stiffness' of each of the fastening fingers 34. However, if the stiffnesses' of the fastening fingers 34 are to differ at all, it is preferred that the difference between the stiffnesses' of each pair of the fastening fingers 34 be about or less than twenty percent of the individual stiffness of each of the fastening fingers 34.

Figure 11:
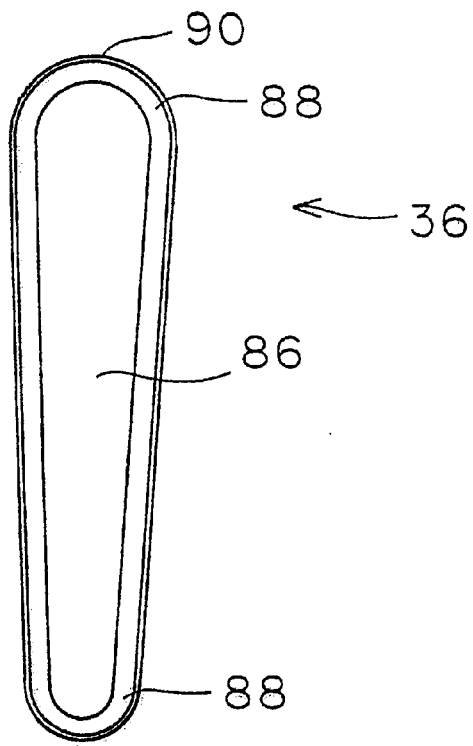
FIG. 11 is an outer side elevational view of the lid member for the crank arm illustrated in FIGS. 3–7.
Figure 12:
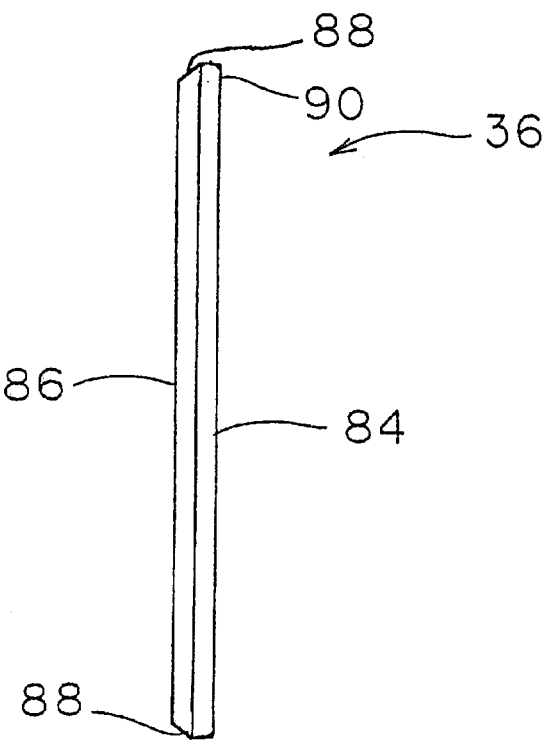
FIG. 12 is an end elevational view of the lid member illustrated in FIG. 11 for the crank arm illustrated in FIGS. 3–7.

Referring now to FIGS. 11 and 12, lid member 36 is shaped to correspond to the periphery of recess 56 and has a flat outer surface 84 and a flat inner surface 86 with a peripheral flange 88. Preferably, flange 88 is angled downwardly to engage step or ledge 58 of crank portion 32 such that an annular groove is formed for welding lid member 36 to crank portion 32 as mentioned above and as seen in FIG. 7. The inner end 90 of lid member 36 is ground down to remove the access weld material as well as to provide the desired finish as shown by the hatching FIG. 5. Lid member 36 is preferably formed of the same material as crank portion 32, and formed by using conventional manufacturing methods such as stamping or casting.

Figure 13:
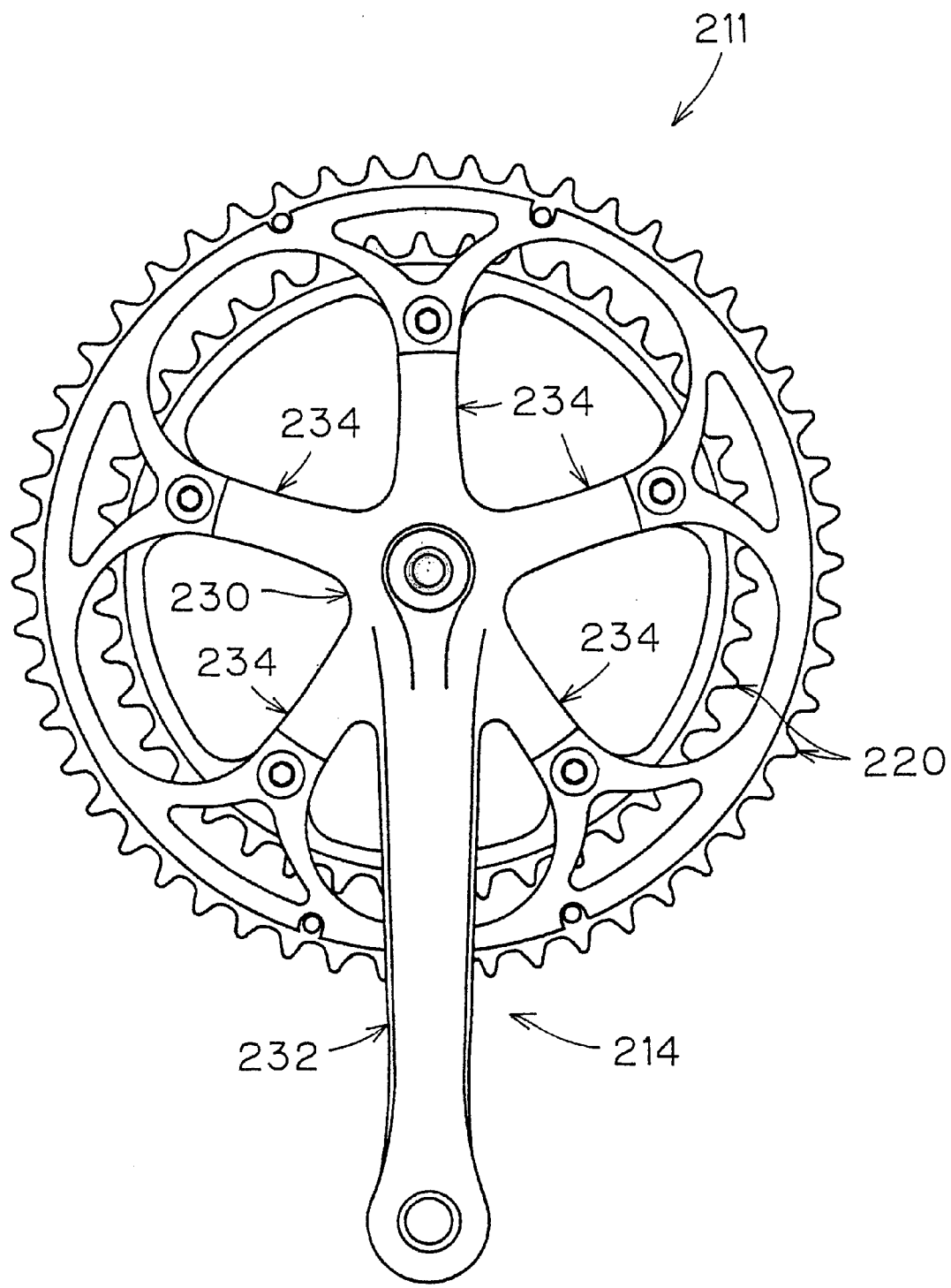
FIG. 13 is a front side elevational view of a crank arm in accordance with a second embodiment of the present invention with a pair of sprockets attached thereto.

Second Embodiment of FIG. 13

Referring now to FIG. 13, a crank set 211 in accordance with a second embodiment of the present invention is illustrated. Crank set 211 has a right crank arm 214 and a pair of sprockets 220. Basically, right crank arm 214 includes a hub portion 230, a crank portion 232, five fastening fingers 234 and a lid member (not shown). Preferably, hub portion 230, crank portion 232 and fastening fingers 234 are all integrally formed as a one-piece, unitary member utilizing conventional manufacturing techniques such as stamping or casting. The lid member, on the other hand, is preferably fixedly coupled to crank portion 232 such that it becomes an integral part of crank portion 232. Hub portion 230, crank portion 232 and fastening fingers 234 are all constructed in the same manner as the first embodiment. Thus, this embodiment will not be discussed or illustrated in detail.

Basically, the only substantive difference between the first and second embodiments are the number of sprockets attached thereto.

Figure 14:
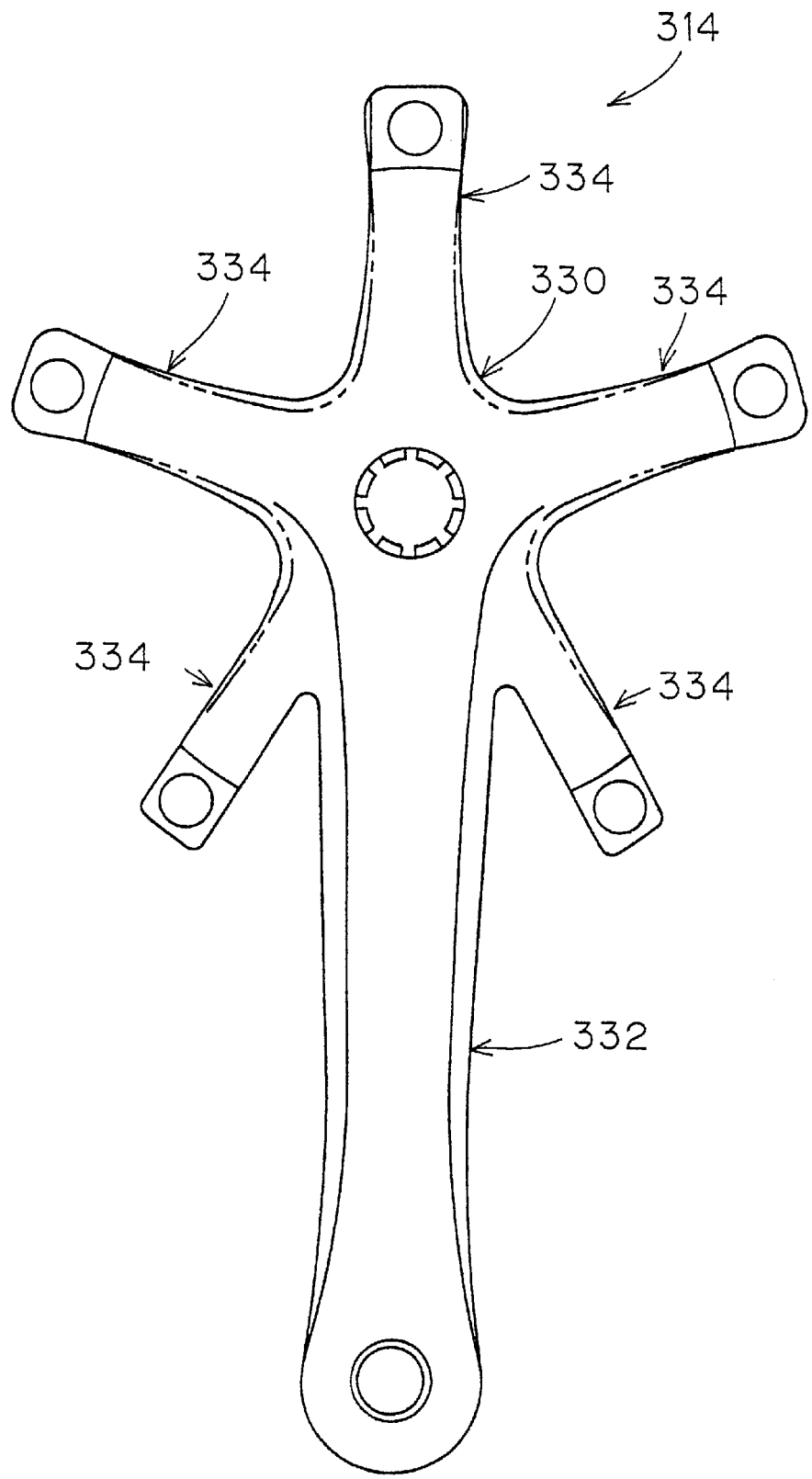
FIG. 14 is a front side elevational view of a crank arm in accordance with a third embodiment of the present invention.

Third Embodiment of FIG. 14

Referring now to FIG. 14, a right crank arm 314 in accordance with a third embodiment of the present invention is illustrated. Basically, right crank arm 314 includes a hub portion 330, a crank portion 332, five fastening fingers 334 and a lid member (not shown). Preferably, hub portion 330, crank portion 332 and fastening fingers 334 are all integrally formed as a one-piece, unitary member utilizing conventional manufacturing techniques such as stamping or casting. The lid member, on the other hand, is preferably fixedly coupled to crank portion 332 such that it becomes an integral part of crank portion 332. Hub portion 330, crank portion 332 and fastening fingers 334 are all constructed in the same manner as the first embodiment. Thus, this embodiment will not be discussed or illustrated in detail.

Basically, the only substantive difference between the first and third embodiment is the shape of the two fastening fingers 334 which are adjacent to crank portion 332. Preferably, the two fastening fingers 334 which are adjacent to crank portion 332 are narrower than fastening fingers 334 which are not adjacent to crank portion 332 as shown in FIG. 14.

Accordingly, the two fastening fingers 334 which are adjacent to crank portion 332 are modified such that each of the five fastening fingers 334 has substantially the same the stiffness in a direction normal to their flat sections 368 at their free ends 360. However, it is acceptable if the individual difference between the stiffnesses' of each fastening fingers 334 is less than 50% of the individual stiffness' of each of the fastening fingers 334. The difference between the stiffnesses' of each of fastening fingers 334 is also acceptable if it is less than 30% of the individual stiffnesses' of each of the fastening fingers 334. However, if the stiffness' of the fastening fingers 334 are to differ at all, it is preferable that the difference between the stiffness' of each of fastening fingers 334 be about or less than 20% of the individual stiffness' of each of the fastening fingers 334.

It will be apparent to those skilled in the art that the rear side of fastening fingers 334 can be manufactured in the same manner as the rear side of fastening fingers 34 of the first embodiment of the present invention. In other words, the fastening fingers 334 which are adjacent crank portion 332 can be free of ribs, while the remaining fastening fingers 334 can have ribs. However, it will be apparent to those skilled in the art that the rear sides of fastening fingers 334 adjacent to crank portion 332 could be manufactured with various modifications. For example, the rear sides of fastening fingers 334 adjacent to crank portion 332 could be manufactured with ribs similar to fastening fingers 334 which are not adjacent to crank portion 332, since the stiffness of the fastening fingers adjacent crank portion 332 has been reduced by changing its width, i.e., the two fastening fingers 334 which are adjacent to crank portion 332 are narrower than fastening fingers 334 which are not adjacent to crank portion 332.

Figure 15:
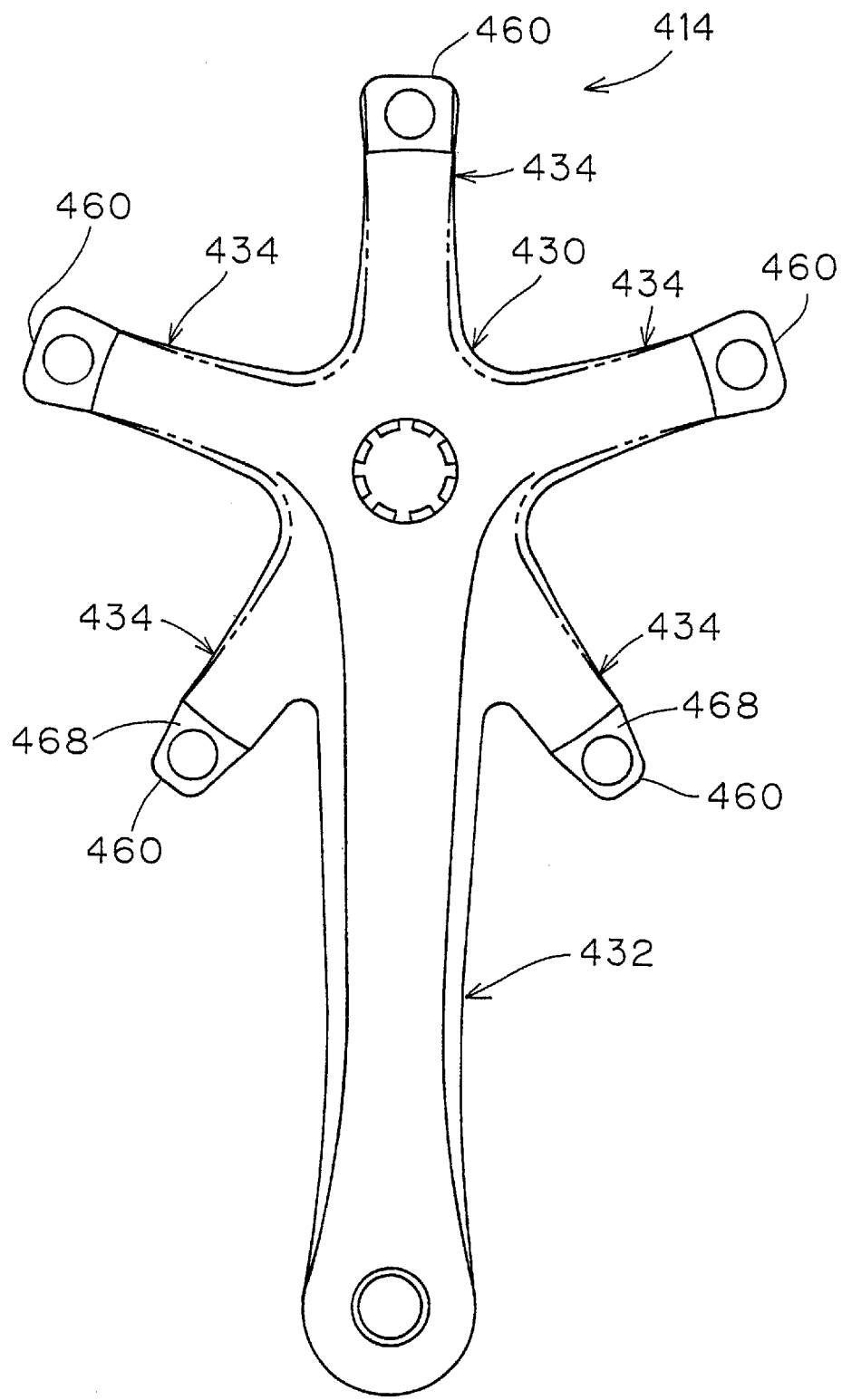
FIG. 15 is a front side elevational view of a crank arm in accordance with a fourth embodiment of the present invention.

Fourth Embodiment of FIG. 15

Referring now to FIG. 14, a right crank arm 414 in accordance with the present invention is illustrated. Basically, right crank arm 414 includes a hub portion 430, a crank portion 432, five fastening fingers 434 and a lid member (not shown). Preferably, hub portion 430, crank portion 432 and fastening fingers 434 are all integrally formed as a one-piece, unitary member utilizing conventional manufacturing techniques such as stamping or casting. The lid member, on the other hand, is preferably fixedly coupled to crank portion 432 such that it becomes an integral part of crank portion 432. Hub portion 430, crank portion 432 and fastening fingers 434 are all constructed in the same manner as the first embodiment. Thus, this embodiment will not be discussed or illustrated in detail.

Basically, the only substantive difference between the first and fourth embodiments is the shape of the outer sprocket mounting portions 468 at the free ends 460 of fastening fingers 434 adjacent crank portion 432 as seen in FIG. 15. Preferably, the flat outer free ends 460 of fastening fingers 434 which are adjacent crank portion 432 will be in the shape of a trapezoid. This arrangement results in the connections between fastening fingers 434 and the associate sprocket to have substantially the same stiffnesses. In other words, by making the free ends 460 of the two fastening fingers 434 adjacent crank portion 432 more flexible, the stiffnesses of the free ends 460 are substantially the same.

Accordingly, the two fastening fingers 434 which are adjacent to crank portion 432 are modified such that each of the five fastening fingers 434 have substantially the same the stiffnesses in a direction normal to their flat sections 468 at their free ends 460. However, it is acceptable if the individual difference between the stiffnesses' of each fastening fingers 434 is less than 50% of the individual stiffnesses' of each of the fastening fingers 434. The difference between the stiffnesses' of each of fastening fingers 434 is also acceptable if it is less than 30% of the individual stiffnesses' of each of the fastening fingers 434. However, if the stiffnesses' of the fastening fingers 434 are to differ at all, it is preferable that the difference between the stiffnesses' of each of fastening fingers 434 be about or less than 20% of the individual stiffnesses' of each of the fastening fingers 434.

It will be apparent to those skilled in the art that the outer free ends 460 of fastening fingers 434 adjacent crank portion 432 could be formed into other shapes as desired or needed to reduce the stiffnesses of these fastening fingers. For example, outer free ends 460 of fastening fingers 434 adjacent crank portion 432 could be circular.

While only fourth embodiments of the present invention have been described and illustrated, it will be apparent to those skilled in the art once given this disclosure that various modifications, changes, improvements and variations may be made without departing from the spirit or scope of this invention as defined in the following claims.

It will be apparent to those skilled in the art that the rear side of fastening fingers 434 can be manufactured in the same manner as the rear side of fastening fingers 34 of the first embodiment of the present invention. In other words, the fastening fingers 434 which are adjacent crank portion 432 can be free of ribs, while the remaining fastening fingers 434 can have ribs. However, it will be apparent to those skilled in the art that the rear sides of fastening fingers 434 adjacent to crank portion 432 could be manufactured with various modifications. For example, the rear sides of fastening fingers 434 adjacent to crank portion 432 could be manufactured with ribs similar to fastening fingers 434 which are not adjacent to crank portion 432, since the stiffnesses of the fastening fingers adjacent crank portion 432 has been reduced by changing the shapes of the sprocket mounting portions 468, i.e., the two fastening fingers 434 which are adjacent to crank portion 432 have more flexible the sprocket mounting portions 468.

While only four embodiments of the present invention have been described and illustrated, it will be apparent to those skilled in the art once given this disclosure that various modifications, changes, improvements and variations may be made without departing from the spirit or scope of this invention as defined in the following claims.

What is claimed is:

1. A bicycle crank arm comprising:
   a bicycle hub portion;
   a crank portion having an inner end coupled to said hub portion and an outer free end; and
   at least three fastening fingers extending radially outwardly from said hub portion to free ends for forming bicycle sprocket mounting portions, said inner end of said crank portion interconnecting a pair of said fastening fingers, each of said fastening fingers having a front surface and a stiffness in a direction normal to respective said front surface at respective said free ends, the difference between each of said stiffnesses' being less than thirty percent of each of said stiffnesses' individually, each of said fastening fingers not adjacent to said crank portion including a longitudinally extending rib.

2. A bicycle crank arm according to claim 1, wherein said crank portion has a longitudinally extending recess between said inner end and said outer end.

3. A bicycle crank arm according to claim 2, wherein said recess is covered by a lid member fixedly secured over said recess.

4. A bicycle crank arm according to claim 1, wherein at least a total of five fastening fingers extend radially outwardly from said hub portion.

5. A bicycle crank arm according to claim 1, wherein said rib of each of said fastening fingers not adjacent to said crank portion is centrally located.

6. A bicycle crank arm according to claim 5, wherein each of said fastening fingers not adjacent to said crank portion has a longitudinally extending groove on each side of each of said ribs.

7. A bicycle crank arm according to claim 6, wherein each of said fastening fingers interconnected with said crank portion has a longitudinally extending groove.

8. A bicycle crank arm according to claim 7, wherein said grooves are offset from the longitudinal axis of said fastening fingers which are interconnected with said crank portion.

9. A bicycle crank arm according to claim 1, wherein said difference between each of said stiffnesses' is less than twenty percent of each of said stiffnesses' individually.

10. A bicycle crank arm according to claim 1, wherein said hub, said crank portion, and said fastening fingers are all integrally formed as a one-piece, unitary member.

11. A bicycle crank arm comprising:
    a bicycle hub portion;
    a crank portion having an inner end coupled to said hub portion and an outer free end; and
    at least a total of five fastening fingers extending radially outwardly from said hub portion to free ends for forming bicycle sprocket mounting portions, said inner end of said crank portion interconnecting a pair of said fastening fingers, each of said fastening fingers having a front surface and a stiffness in a direction normal to respective said front surface at respective said free ends, the difference between each of said stiffnesses' being less than thirty percent of each of said stiffnesses' individually, each of said fastening fingers not adjacent to said crank portion including a longitudinally extending rib; and at least one sprocket couple to said free ends of said fastening fingers.

12. A bicycle crank arm comprising:

a bicycle hub portion;

a crank portion having an inner end coupled to said hub portion and an outer free end; and at least three fastening fingers extending radially outwardly from said hub portion to free ends for forming bicycle sprocket mounting portions, said inner end of said crank portion interconnecting a pair of said fastening fingers, each of said fastening fingers having a longitudinal axis extending radially outwardly from said hubs, each of said pair of fastening fingers interconnected with said crank portion having a longitudinally extending groove and a web section that extends from said respective groove to said crank portion, said fastening fingers not adjacent to said crank portion having a longitudinal extending rib.

13. A bicycle crank arm according to claim 12, wherein said rib of each of said fastening fingers not adjacent to said crank portion is centrally located.

14. A bicycle crank arm according to claim 13, wherein each of said fastening fingers not adjacent to said crank portion has a longitudinally extending groove on each side of each of said ribs.

15. A bicycle crank arm according to claim 14, wherein said grooves of said fastening fingers interconnected with said crank portion are offset from the longitudinal axis of said fastening fingers which are interconnected with said crank portion.

16. A bicycle crank arm according to claim 12, wherein said crank portion has a longitudinally extending recess between said inner end and said outer end.

17. A bicycle crank arm according to claim 16, wherein said recess is covered by a lid member fixedly secured over said recess.

18. A bicycle crank arm according to claim 12, wherein at least a total of five fastening fingers extend radially outwardly from said hub portion.

* * * * *